Aug. 25, 1936.   D. DOMIZI   2,051,987
PRIMARY ELECTRIC CELL
Filed Jan. 14, 1931   2 Sheets-Sheet 1
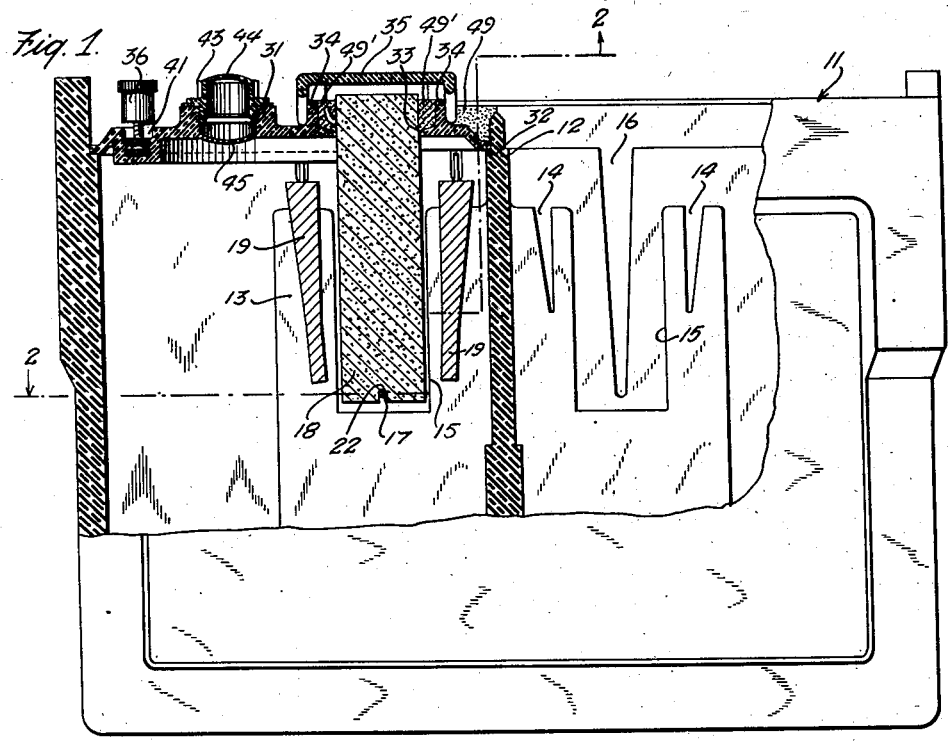
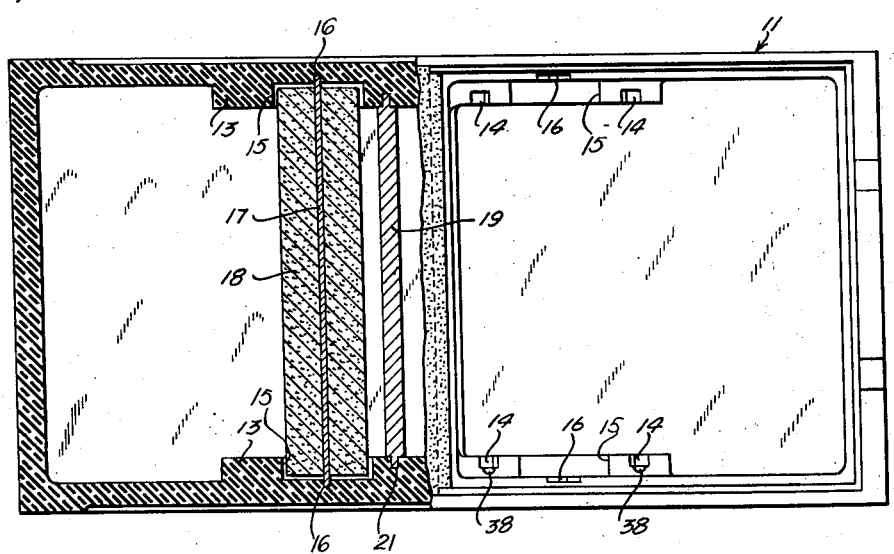
INVENTOR:
Dario Domizi,
BY Byrnes Townsend & Potter,
ATTORNEYS.

Aug. 25, 1936. D. DOMIZI 2,051,987
PRIMARY ELECTRIC CELL
Filed Jan. 14, 1931 2 Sheets-Sheet 2
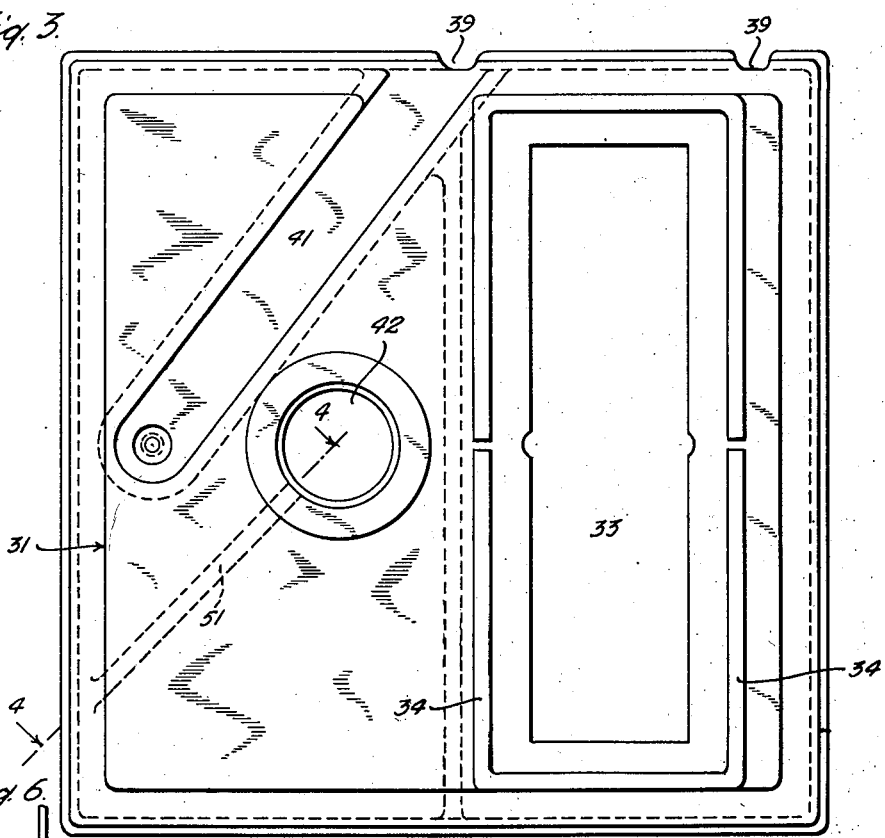
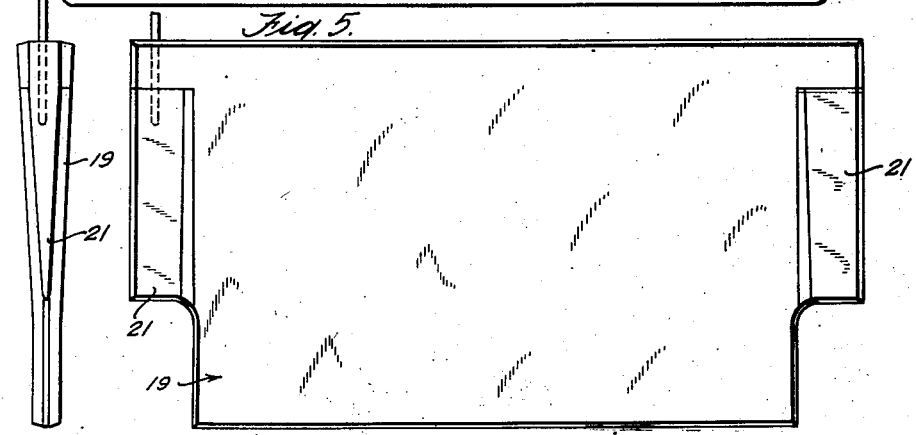
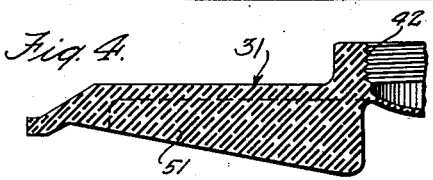

Patented Aug. 25, 1936

2,051,987

UNITED STATES PATENT OFFICE

2,051,987

PRIMARY ELECTRIC CELL

Dario Domizi, Lakewood, Ohio, assignor, by mesne assignments, to Union Carbide and Carbon Corporation, a corporation of New York Application January 14, 1931, Serial No. 508,788
In Great Britain August 27, 1930

6 Claims. (Cl. 136—86)

This invention relates to primary electric cells and especially to that type of cell having a porous carbon electrode and metal electrodes and in which air permeates the carbon electrode for the purposes of depolarization. An object of my invention is to provide improved means for supporting and spacing the carbon and metallic electrodes. Another object of my invention is to provide an improved seal for preventing the entrance of moisture before the cell is placed in use. A further object of my invention is to provide an accurate means for indicating the amount of liquid required to fill the cell. A still further object of the invention is to provide an improved cover for such a cell.

These and other objects of my invention will be evident from the following specification having reference to the accompanying drawings in which;

Fig. 1 is a longitudinal section of a cell illustrating one embodiment of my invention.

Fig. 2 is a plan view thereof, a portion being taken in section on the line 2—2 of Fig. 1.

Fig. 3 is a top view of one of the covers.

Fig. 4 is a detailed section on the line 4—4 of Fig. 3.

Fig. 5 is a front elevation of one of the metal electrodes, and

Fig. 6 is an end view of the same.

In Fig. 1, I show two cells, constructed in accordance with my invention, assembled in a unitary casing. In the right hand cell the cover and electrodes are removed. The casing 11 is provided with a central wall 12 dividing the two cells. Adjacent the central wall 12 are inwardly extending portions 13 having recesses 14 and 15 for receiving the electrodes. Within the recess 15 is a deeper recess 16 for receiving a rod 17, which serves as a support for the carbon electrode 18. The electrodes 19, of zinc or other metal, are provided at the ends with protruding members 21 for engagement with the recesses 14. It will be noticed that the grooves 14 converge downwardly, thus making the bottoms of the zinc electrodes nearer the carbon electrodes than the top.

The carbon electrode 18 is provided with a groove 22 at the bottom for engagement with the rod 17.

The cover 31 engages the walls of the cell container and rests upon a shoulder 32 provided therefor. The cover is provided with an opening 33 through which the carbon electrode projects. Surrounding the opening 33 is a ridge 34 which serves to hold in place a protective cover 35 for the carbon electrode and serves as a dam for the plastic seal 49. This permits the use of a soft seal 49', having a lower melting point, around the carbon electrode. This is desirable since the use of a seal having a high melting point might injure the carbon electrode. It is not necessary that this seal be as hard as that elsewhere since it is protected by the electrode cover. This dam also serves to protect the carbon electrode from liquids spilled on the cover of the battery. The battery cover is also provided with a binding post 36 for receiving the connections to the external circuit. When a two cell battery is used the connections from the zinc electrodes of one cell are joined to the connections from the carbon electrode of the other cell, the remaining connections of each cell being led to the binding posts of the respective covers. The connections from the zinc electrodes extend through suitable grooves 38 in the cell wall and 39 in the cover. In the cell in which the connections from the zinc electrodes extend to the binding post they are led through a groove 41 in the top of the cover.

In cells of the type described herein it has been found advantageous to cast a block of electrolyte forming material, such as the monohydrate of caustic soda, about the electrodes. This forms a protection for the electrodes during shipment and has numerous other advantages. This material takes up water very readily and it is desirable that the battery should be sealed during shipment. At the same time it is desirable that the seal should be easily broken to permit the addition of water which dissolves the electrolyte forming material. To secure the desired result I provide a filling opening 42 on which is secured a cap 43; this cap having an opening 44 to permit the venting of the cell during use. While I may use a dummy cap without this opening during shipment I have found a satisfactory procedure to consist of forming a thin diaphragm 45 integral wtih the top. This diaphragm is relatively thin and can easily be broken away when it is desired to fill the cell for use. This diaphragm, being of the same material as the cell cover, is inert and the pieces may be allowed to fall into the cell. The electrolyte-forming material dissolves without evolution of great heat as would be the case if anhydrous caustic were used. Since the zinc electrodes should be completely covered by electrolyte at all times, and since the battery should not be so full of liquid that there is danger of spillage or overflow, it is desirable to provide means whereby the correct level of the electrolyte may be indicated. I prefer to do this by providing a rib 51 on the under surface of the cover having an end adjacent the opening 42 so that it shall readily be visible from the top during the filling of the cell. The portion of the rib adjacent the filling opening should be such that the correct level of liquid is secured when it just touches the bottom of the rib.

I claim:

1. A primary cell having metal electrodes, and a porous carbon electrode extending through the cover thereof, comprising a container having walls, means on opposite walls of the cell for supporting only the metal electrodes and means extending between and supported by opposite walls of the cell for supporting only the carbon electrode.

2. A primary electric cell comprising a container of insulating material, a horizontal member supported by and extending between opposite walls above the bottom of said container, an electrode having a groove lengthwise of the bottom thereof resting upon said member, said opposed walls being provided with grooves and a metal electrode engaging said grooves.

3. A primary electric cell comprising a container, a carbon electrode and at least one metal electrode, said container being provided with grooves on opposed walls, a horizontal member extending between a pair of opposed grooves, said carbon electrode being provided with a groove to engage said horizontal member, said metal electrodes being provided with reduced sections at the ends thereof for engaging another pair of opposed grooves.

4. A primary electric cell comprising a container, a carbon electrode and a plurality of metallic electrodes, the container being provided with recesses in opposed walls for receiving the carbon electrode, a deeper recess in each of said recesses, a rod extending between said deeper recesses and engaging the bottom of the carbon electrode and downwardly converging recesses on either side of the carbon electrode for receiving the metallic electrodes.

5. A primary battery comprising a pair of cells in a single container having a wall between said cells integral with the container, said cells having electrodes unsymmetrically placed, said electrodes being nearer the common wall between the cells than the end wall to facilitate electrolyte circulation and electrode interconnection.

6. A primary electric cell comprising a container of insulating material, a horizontal member spaced from the bottom of said container and extending between and supported by opposed walls of said container, a carbon electrode resting upon said horizontal member over substantially the entire portion thereof, the greatest horizontal dimension of said electrode being parallel to the longitudinal axis of said horizontal member, said opposed walls being provided with grooves and a metal electrode engaging said grooves.

DARIO DOMIZI.